J. E. MOWERSON & C. S. DE BAUN.

Improvement in Axle Lubricators.

No. 125,477.

Patented April 9, 1872.

125,477

UNITED STATES PATENT OFFICE.

JOHN E. MOWERSON AND CORNELIUS S. DE BAUN, OF WESTWOOD, N. J.

IMPROVEMENT IN AXLE-LUBRICATORS.

Specification forming part of Letters Patent No. 125,477, dated April 9, 1872.

Specification describing a new and useful Improvement in Axle-Lubricators, invented by JOHN E. MOWERSON and CORNELIUS S. DE BAUN, of Westwood, in the county of Bergen and State of New Jersey.

The invention consists in flanging the oil-cup at top, concaving it on the sides, and pressing its lower ends against a flexible packing in the axle-box, whereby the oil-holder cannot work upwardly, but is always held firmly in place, and must deliver its lubricating matter with great uniformity.

Figure 1:
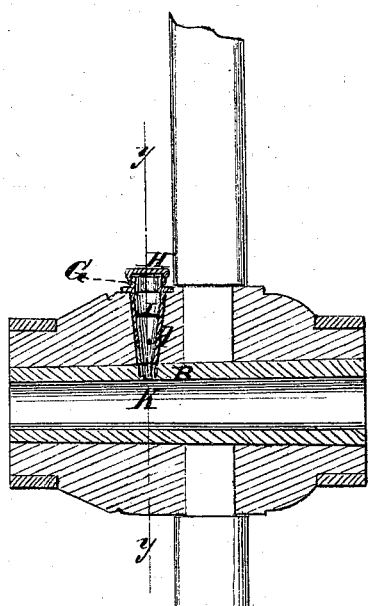
Figure 2:
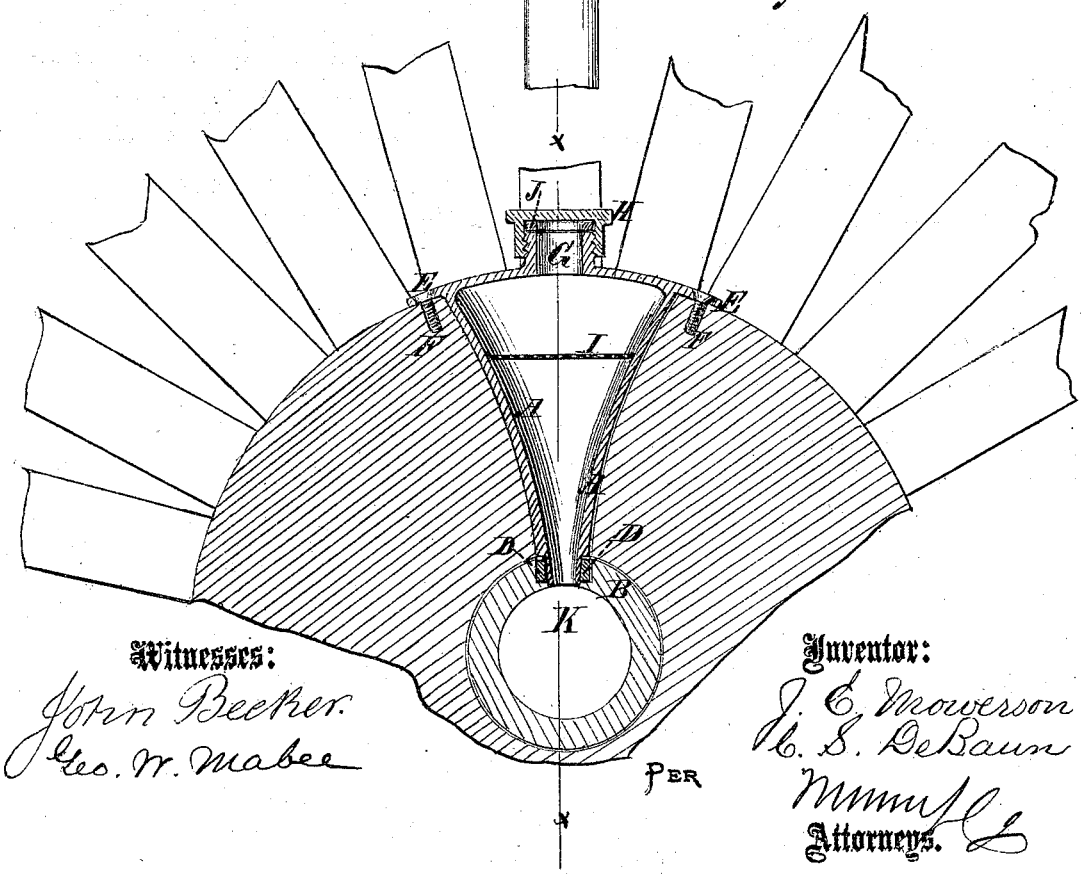

Figure 1 is a longitudinal section of a wheel-hub and our improved oiler on the line $x\ x$ of Fig. 2, and Fig. 2 is a transverse section on the line $y\ y$ of Fig. 1.

Similar letters of reference indicate corresponding parts.

A is the flattened funnel, fitted in a socket in the hub, with its small end entering the cast-iron box B, which has a hole through it, and packed in said hole, which is enlarged in the upper part for the purpose, with flexible packing D. The top has a flange, E, projecting from two sides in the direction of the greatest diameter, by which it is secured by screws F. G is the tubular projection around the hole for filling, to receive the cap H, which is made tight by a disk or ring, J, of packing in the bottom of its hole. I is the diaphragm of wire-gauze, for supporting the absorbent material, and preventing the clogging of the nozzle K.

This improved lubricator is arranged in the hub with its greatest diameter in the circumferential direction of the hub, as shown, and has the advantage over others of a larger oil-chamber in a recess of a given capacity.

Having thus described my invention, I claim as new and desire to secure by Letters Patent—

An oil-holder, A, flanged on the upper ends, concaved on the outer sides, and recessed at the outer ends, in combination with axle-box B, recessed correspondingly, and provided with packing D, as and for the purpose described.

JOHN E. MOWERSON.
CORNELIUS S. DE BAUN.

Witnesses:
BENJAMIN Z. VAN EMBURGH,
ISAAC D. BOGERT.